United States Patent [19]

della Porta et al.

[11] 4,124,659
[45] * Nov. 7, 1978

[54] GETTERING IN NUCLEAR FUEL ELEMENTS

[75] Inventors: Paolo della Porta; Tiziano A. Giorgi; Livio Rosai, all of Milan, Italy

[73] Assignee: S.A.E.S. Getters S.p.A., Milan, Italy

[*] Notice: The portion of the term of this patent subsequent to Apr. 13, 1993, has been disclaimed.

[21] Appl. No.: 731,805

[22] Filed: Oct. 12, 1976

Related U.S. Application Data

[63] Continuation of Ser. No. 465,662, Apr. 30, 1974, abandoned.

[30] Foreign Application Priority Data

May 2, 1973 [IT] Italy ............................. 23613 A/73

[51] Int. Cl.² ............................................. G21C 21/00
[52] U.S. Cl. ................................... 264/0.5; 176/68
[58] Field of Search ........................... 264/0.5; 29/428; 176/68

[56] References Cited

U.S. PATENT DOCUMENTS

| | | | |
|---|---|---|---|
| 3,141,830 | 7/1964 | Klepfer et al. | 176/68 |
| 3,519,537 | 7/1970 | Ferrari | 176/68 |
| 3,683,148 | 8/1972 | Boyko et al. | 176/79 |
| 3,762,995 | 10/1973 | Gulbransen et al. | 176/68 |
| 3,774,010 | 11/1973 | Heer et al. | 176/68 |
| 3,836,431 | 9/1974 | Flipot et al. | 176/79 |
| 3,949,460 | 4/1976 | della Porta et al. | 176/68 X |

*Primary Examiner*—Peter A. Nelson
*Attorney, Agent, or Firm*—Littlepage, Quaintance, Murphy, Richardson and Webner

[57] ABSTRACT

A method of manufacturing a nuclear reactor fuel element which contains a pre-activated non-evaporable getter material such that the getter material starts to sorb gases at a temperature lower than the temperature at which the fuel element walls start to sorb gas. The invention is further directed to a getter device which can be employed in a nuclear fuel element and the nuclear fuel element per se.

7 Claims, 7 Drawing Figures

GETTERING IN NUCLEAR FUEL ELEMENTS

This is a continuation of application Ser. No. 465,662, filed Apr. 30, 1974, which is now abandoned.

FIELD OF THE INVENTION

This invention relates to a fuel element for a nuclear reactor and in particular it relates to a hermetically sealed fuel element composed of a metal tube containing fissionable material as well as a non-evaporable getter material capable of sorbing gases at ambient temperatures.

DESCRIPTION OF THE PRIOR ART

A common type of power reactor fuel element currently in use consists of a refractory ceramic fuel contained within a sealed thin walled tubular sheath that is disposed in a pressurized water atmosphere.

Such fuel elements produce fission product gases from the fuel, which gases exert an internal pressure within the fuel element sheath.

The cyclical operations of a power reactor over a given period of time, such as 24 hours, result in extreme variations in temperature and pressure externally as well as internally of the fuel element. These variations of internal and external pressure subject the sheath of the fuel element to forces which can lead to rupture due to the strain on the metal forming the sheath or cladding.

The sheath serves two main purposes: first, to prevent contact and chemical reactions between the nuclear fuel and the coolant or the moderator if present, or both: and second, to prevent the highly radioactive fission products, some of which are gases, from being released into the coolant or moderator, or both. Common sheath materials are stainless steel, aluminum and its alloys, zirconium and its alloys, niobium, yttrium and their alloys, certain magnesium alloys and others. The rupture of this sheath can contaminate the coolant or moderator and the associated systems with highly radioactive products to a degree which interferes with plant production.

Serious problems have been encountered in the manufacture and operation of nuclear fuel elements which employ certain metals and alloys as the sheath material, due to the reactivity of these materials under certain circumstances. Zirconium and its alloys under normal circumstances are excellent materials for a nuclear fuel sheath as they have low neutron cross sections and at temperatures below about 300° C. are extremely stable and non-reactive in the presence of demineralized water or steam which are commonly used as reactor coolants and moderators. At higher temperatures, however, the protective oxide film on the surface of these materials appears to fail more rapidly and the material deteriorates apparently due to exposure at these temperatures to water and water vapor. The film is also adversely affected by such active gases as hydrogen, oxygen, nitrogen, carbon monoxide, and carbon dioxide at all temperatures.

Sintered refractory and ceramic compositions, such as uranium dioxide and others used to nuclear fuels release measurable quantities of one or more of the above-mentioned gases during manufacture or irradiation of the metal sheathed fuel element, eventhough these gases have been excluded as far as possible from the ambient atmosphere during manufacture of the sheath and fuel element. These gases react with the zirconium base sheath material containing the nuclear fuel. The results of this reaction include embrittlement of the sheath which can lead to premature failure of the fuel element. Although water and water vapor do not react directly to produce this result, at high temperatures water vapor does react with zirconium to produce hydrogen and this gas further reacts with the zirconium to cause embrittlement.

Furthermore, the release of the gases within the sealed fuel element increases the internal pressure within the element, introducing additional undesirable stresses. Monatomic gases such as krypton and xenon are also produced as fission reaction products.

The provision of a controlled amount of gas pressure within the fuel element is desirable to offset at least a major portion of the external pressure of the pressurized water coolant to the extent that it reduces the problem of excessive strain and early fatigue failure of the sheath.

In an attempt to solve some of these problems, it has been proposed to use activated charcoal, alumina or molecular sieves placed at either end of the fuel element as described in U.S. Pat. No. 3,519,537. However, these materials appear to be effective only during reactor operation and their effect is to maintain the rare gas pressure in the fuel element at a more constant value.

An attempt to reduce embrittlement of the sheath material has been made by providing the fuel element with a compact of material, capable of sorbing active gases, within a cavity situated in an end closure as described in U.S. Pat. No. 3,141,830. The preferred material of the compact is zirconium having a bulk density of between about 50% and 85% of the theoretical density of the metal from which it is made. While this technique has had some success in reducing the number of fuel element sheath failures, due to fatigue effects following sheath embrittlement by gas sorption, the number of failures still occurring is troublesome. Furthermore, the life of the fuel element is still not as long as would be desired. This probably occurs because it is necessary to heat the gas sorbing or getttering compact to a high temperature before it is able to start sorbing gas. The sheath walls are also heated to this high temperature and become capable of sorbing the active gas leading to embrittlement. The ternary alloy sheets of nickel-titanium-zirconium employed by Grossman, U.S. Pat. No. 3,742,367 as a getter material in nuclear fine elements are very time consuming and laborious to prepare. More importantly the getter material of Grossman has a low sorptive capacity at low temperatures and a low pumping speed.

Accordingly, it is an object of the present invention to provide an internal gas sorption means for nuclear fuel elements so as to prevent sorption of active gases by the fuel element sheath walls.

Another object of the present invention is to provide an internal gas sorption means for nuclear fuel elements which is capable of starting to sorb active gases at temperatures lower than the temperature at which the fuel element sheath walls start to sorb gas.

A further object of the present invention is to provide an internal gas sorption means for a nuclear fuel element which can be rendered gas sorptive before insertion within the nuclear fuel element.

A further object of the present invention is to provide a getter device capable of partially supporting the thin walls of the fuel element sheath against the pressurized water atmosphere of a nuclear reactor.

Yet another object of the present invention is to provide a gas sorption means capable of being activated before being placed in a nuclear fuel element.

Another object of the present invention is to provide a pressure openable encapsulated gas sorption device for insertion in a nuclear fuel element.

Another object of the present invention is to provide a process for manufacturing a nuclear fuel element containing an internal gas sorption means capable of starting to sorb active gases at temperatures lower than the temperature at which the fuel element sheath walls start to sorb gas.

Additional objects and advantages of the present invention will be apparent by reference to the following detailed description thereof and drawings wherein.

Figure 1:
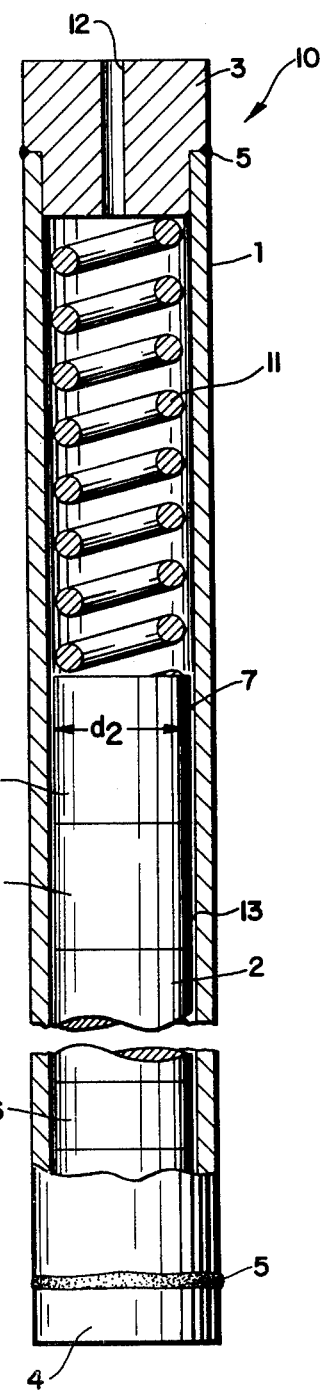
FIG. 1 is a sectional view of a nuclear fuel element.

According to the present invention there is provided a nuclear fuel element which contains a pre-activated non-evaporable getter material such that the getter material starts to sorb gases at a temperature lower than the temperature at which the fuel element walls start to sorb gas. The getter device, the nuclear fuel element and the method of manufacturing these as per the instant invention are given below.

The nuclear reactor fuel element of the present invention comprises a hermetically sealed metallic container having walls forming a fuel containing chamber and a plenum chamber. A body of fissionable material is placed within the fuel containing chamber. A getter device containing a non-evaporable getter material having a sorptive capacity of 5 cc-torr/g of carbon monoxide at 20° C. is placed within the plenum chamber. The getter material starts to sorb active gases at a temperature lower than the temperature at which the walls of the fuel containing chamber start to sorb gas. The nuclear fuel element further comprises an end closure which is integrally secured and sealed at at least one end of the hermetically sealed metallic chamber. Further, the nuclear fuel element is provided with means for separating the getter material from the end closure. The getter material is either a mixture of particulate zirconium and at least one particulate refractory material, or a mixture of particulate zicronium and particulate zirconium-aluminum alloy. Another embodiment of the nuclear fuel element is that the fuel containing chamber and the plenum chamber are separated by a thermal insulator.

The getter device of the present invention, for insertion within a nuclear reactor fuel element, comprises a cylindrical body of non-evaporable getter material and at least one metallic annular ring, wherein the outside diameter of the metallic annular ring is no less than the outside diameter of said cylindrical body and the inside diameter of the metallic annular ring is less than the outside diameter of the cylindrical body. A novel feature of the present getter device is that it comprises a sealed housing enclosing an activated non-evaporable getter material. The sealed housing is provided with a pressure sensitive rupturing means which ruptures on increasing the pressure outside the sealed housing. The pressure sensitive rupturing means can be of any type, but is preferably a thin metallic sheet or a glass material.

The method of manufacturing the nuclear fuel element of the present invention comprises the steps of (A) pumping the fuel element to sub-atmospheric pressure, (B) heating the fuel element to a temperature below that at which the fuel element walls commence to sorb gas, (C) filling the fuel element with a washing gas to about atmospheric pressure, (D) pumping the fuel element to sub-atmospheric pressure, (E) inserting a non-evaporable activated getter material enclosed in a housing having a pressure sensitive rupturing means into the plenum chamber of the nuclear fuel element, (F) filling the fuel element with a rare gas to super atmospheric pressure, whereby the rupturing means is ruptured and (G) sealing the fuel element and (H) heating the fuel element and getter material to a temperature below that at which the fuel element walls commence to sorb gas.

The heating step H is preferably carried out at a temperature of 20° to 250° C., preferably 120° C. to 250° C. and most preferably 175° C. to 225° C. Each of the above-described steps can be carried out one or more times depending on the requirement. The sub-atmospheric pressure can conveniently be in the range of 700 mm of mercury to $10^{-4}$ torr and preferably be in the range of 1 mm of mercury to $10^{-2}$ torr. The super-atmospheric pressure is at least 1.1 atmospheres, preferably in the range of 1.1 to 50 atmospheres and most preferably 2 to 40 atmospheres. The washing gas can be any unobjectionable gas but preferably is nitrogen. The rare gas can be any one of the rare gases known, but preferably helium and argon because of their availability.

In the manufacture of a nuclear fuel element containing fuel pellets and a plenum chamber the latter stages consist of heating a partially evacuated fuel element to remove water vapor and other unwanted gases from the fuel pellets and other internal surfaces of the fuel element. Subsequently, a flow of purging or washing gas, such as nitrogen is often used, and after further evacuation the fuel element is filled once again to a super-atmospheric pressure with He, then the fuel element is sealed. The sealing process, of the end cap to the sheath, is usually a welding operation which creates sufficient heat to activate a getter material resting upon the end cap, or placed in a recess in the end cap. The temperature reached is sufficient to also activate the internal surfaces of the end cap and sheath surfaces near the end cap.

In the prior art processes the water vapor and other unwanted gases released on subsequent heating of the fuel element would be absorbed by the activated sheath walls as well as by the getter material leading to the embrittlement and early fuel element failure.

In the method of the present invention a getter material is activated before being placed in the fuel element. In this way sealing methods can be adopted which ensure that the internal surfaces of the fuel element do not reach temperatures at which they are activated. The fuel element, containing the getter device can then be subsequently heated to drive off water vapor and other unwanted gases from the fuel pellets and other internal surfaces which are then sorbed only by the getter material and not by the fuel element sheath or end caps.

The getter device can be in the form of a sintered mass with or without a metal or graphite holder or metal rings. It can be activated by heating to about 950° C. for a few minutes, depending upon the getter material used, immediately prior to insertion within the fuel element.

Any conventional technique may be used to activate the getter material such as induction heating, heating by infra-red radiation or by direct contact with a heated surface. This activation can take place in a vacuum or inert gas filled chamber such as a glove-box to which the fuel element is also attached so that the activated getter can be placed in the fuel element immediately prior to sealing the end cap to the fuel element sheath.

An alternative method of introducing the getter material is to place the getter material, already activated, within a sealed container having a vacuum or inert atmosphere. The container can then be opened within the vacuum or inert gas filled chamber to which the fuel element is attached. The getter device is removed from the container and placed in the fuel element which is subsequently sealed.

A further alternative method of introducing the getter material, already activated, into the fuel element is to place the getter material, already activated, within a sealed container having a vacuum or inert atmosphere. The sealed container in this case has a pressure sensitive rupturing means. The sealed container, containing the activated getter is placed within the fuel element.

When the fuel element is back-filled with a super-atmospheric pressure of helium, immediately prior to sealing the fuel element, the helium pressure ruptures the pressure sensitive rupturing means and places the getter material in contact with the atmosphere within the fuel element. The pressure sensitive rupturing means may be any means which is capable of being ruptured on exposure to a given minimum pressure difference. Such means may be simply a sheet of metal whose thickness has been calculated to withstand only a certain pressure difference across it. The sheet of metal may also be provided with lines of weakness to ensure that its rupture occurs only in predetermined positions. Alternatively the pressure sensitive rupturing means may be constituted of a glass surface whose thickness and shape have been calculated to withstand only a certain pressure difference across it. The glass may be prestressed by known techniques such that upon fracturing the prestressed zone breaks into a large number of small pieces thus ensuring the complete contact of the getter material with the fuel element atmosphere. After the insertion of the getter material and back filling with a super atmospheric pressure of helium the fuel element can be sealed by techniques such as electron beam welding, argon arc welding, or laser beam welding, or other techniques, which, due to localization of heating, do not cause the internal fuel element surfaces to reach such temperatures at which they become active.

The sealed fuel element containing the active getter can now be heated for an extended period of time, at a temperature below the temperature at which the fuel element sheath starts to sorb gas.

This extended heating which is preferably at temperatures between about 120° C. and 250° C. is highly desirable as it is difficult to remove water and other gases from the sintered fuel compacts or pellets due to only a slow diffusion of these gases through the sintered compacts. The water vapor and other gases after diffusion out of the sintered compact are released into the plenum chamber and are sorbed by the getter material. For effective removal of water and other unwanted gases the extended heating is conducted for at least an hour, generally for 1 day to 10 weeks and preferably for 5 days to 4 weeks. It is undesirable to have a temperature below about 120° C. as the diffusion of water vapor and other gases becomes too slow or ceases altogether. If the temperature is raised substantially above 250° C. the internal surfaces of the fuel element may start to become active and start to sorb some of the water vapor or other gases which have not yet been completely removed by the getter material.

The getter device should be sufficiently robust and non-resilient so that on thermal expansion, when the fuel element is raised to the operating temperature of the nuclear reaction, it can act to partially support the thin wall of the fuel element sheath against the pressurized water atmosphere.

Getter materials useful in the present invention can in general be any non-evaporable getter material which is capable of being activated to render it gas sorptive Activation consists of heating the getter material in a vacuum or inert atmosphere such that surface oxides or other compounds, which prevent the getter material from sorbing gas, are removed leaving a clean gas sorptive surface which can sorb active gases.

Examples of non-evaporable getter materials are Zr. Ta, Hf, Nb, Ti, Th and U, alloys and mixtures of one or more of these metals among themselves and with other metals such as aluminum which alloys have satisfactory gettering properties.

A preferred non-evaporable getter material for use in the present invention is an alloy of from 5 to 30 and preferably 13 to 18 weight percent aluminum balance zirconium. The most preferred composition is an alloy of 16 percent aluminum balance zirconium available from SAES Getters S.p.A. Milan, Italy, under the trademark St 101.

Another preferred non-evaporable getter material is a mixture or partially sintered mixture of particulate zirconium and particulate refractory material. Examples of suitable refractory material include among others graphite, diamond, alumina and silica. The most preferred refractory material is graphite. The use of a mixture of particulate zirconium and particulate graphite as getter material is described in U.S. Pat. No. 3,584,253, in which the weight ratio of graphite: zicronium is from 1:100 to 3:7.

A further preferred non-evaporable getter material is a mixture or a partially sintered mixture of particulate zirconium with a particulate alloy of zirconium and aluminum as described in Italian patent application No. 28053 A/72 filed Aug. 10, 1972 and U.S. application Ser. No. 383,677, filed July 30, 1973. The weight ratio of zirconium to zirconium-aluminium alloy is between 19:1 and 2:3 and preferably between 10:1 and 1:1. The zirconium-aluminium alloy preferably has 5 to 30 and preferably 13 to 18 weight percent of aluminium and balance zirconium. The most preferred composition is an alloy of 16 percent aluminum balance zirconium.

The non-evaporable getter material can be employed as particles of widely varying sizes. However, the non-evaporable getter metal, namely zirconium, is generally employed in particle sizes which pass through a screen of 100 mesh per inch and preferably those which pass through a screen of 200 mesh per inch. The Zr-Al alloy and graphite are generally employed in particle sizes which pass through a screen of 32 mesh per inch and preferably those which pass through a screen of 60 mesh per inch. These compositions are preferred because they exhibit high gettering speeds and high sorption capacities and temperatures lower then the temperature at which the fuel element walls start to sorb gas. The getter material useful in the practice of the present invention has a sorptive capacity of at least 5 cc-torr/g, preferably 10 cc-torr/g and most preferably 40 cc-torr/g of carbon monoxide at 20° C.

The sorptive capacity is that capacity measured when the speed of sorption has reduced to 10 cc/g/sec.

Referring now to the drawing and in particular to FIG. 1 there is shown a nuclear fuel element 10, which is particularly suitable for use in a pressurized water type of power reactor. Fuel element 10 includes a sheath 1 enclosing a plurality of fuel pellets or cylinders 2 disposed in butting relationship one with another. Each end of sheath 1 is closed by means of end caps 3 and 4. Annular welds 5 between end caps 3 and 4 and sheath 1 ensure a hermetic sealing of the fuel element 10. The majority of the internal volume of fuel element 10 is occupied by fuel element pellets 2 in a fuel chamber 6 while the remaining volume forms a plenum chamber 7. Within plenum chamber 7 is placed a thermal insulator 8 in contact with the uppermost fuel pellet. In contact with thermal insulator 8 is placed a getter device 9 held in position by one end of pressure spring 11. The other end of pressure spring 11 rests against end cap 3. End cap 3 further contains a hermetically sealable bore hole 12 used during fabrication of fuel element 10. Pressure spring 11 can have a sufficiently large external diameter so as to partially support the wall of the fuel element sheath against the pressurized water atmosphere. A clearance space 13 is provided between the fuel pellets 2, thermal insulator 8 getter device 9 and the sheath 1 to allow for their radial thermal expansion when the fuel element 10 is at the temperature of operation of the power reactor. Sheath 1 is composed of a metal which is substantially inert to the environment of the reactor. Due to the relatively low neutron absorption of zirconium mm it is common to use zirconium based alloys such as zircalloy-2 or zircalloy-4 as the sheath material to effect savings through the use of uranium of lower enrichment and through the reduction in the critical mass of uranium.

Figure 2:
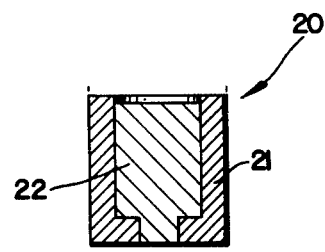
FIG. 2 is a sectional view of a gas sorbing device suitable for use in a nuclear fuel element.

FIG. 2 shows a getter device 20 comprising a container and a getter material 22. Getter device 20 can be used in the position of getter device 9 of FIG. 1. The container 21 can be of any material suitable for use within a nuclear reactor. Such metals as are used to construct the fuel element sheath are preferred. One of such materials is molybdenum. Another suitable material is graphite. Graphite is preferred as it is porous and allows evaporation of the binders used in preparing the getter device. It is also easy to machine to shape and is not a source of contamination. Metals are preferred as the wall thickness of the container can be made much thinner thus allowing a greater quantity of getter material to be contained within the same overall volume.

Figure 3:
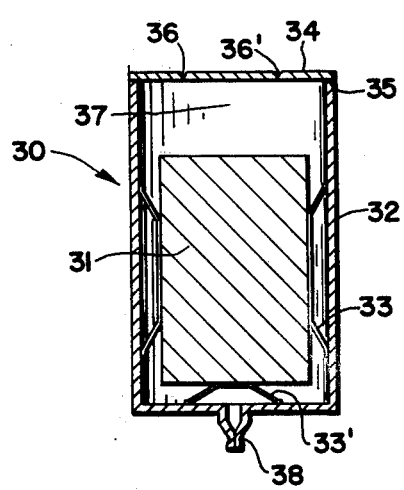
FIG. 3 is a sectional view of an encapsulated gas sorbing device suitable for use in a nuclear fuel element.

FIG. 3 shows a getter device 30, suitable for use in a nuclear fuel element, comprising an activated non-evaporable getter material 31 held within a metal container 32 by optional springs 33, 33' etc. To one end of container 32 is sealed a thin metal foil by a continuous weld 35. Score lines 36, 36' define an area of structural weakness which can be preferentially ruptured. Hermetically sealed space 37 is either vacuum or filled with an inert gas such as helium at slightly above atmospheric pressure via a metal pumping stem 38 wich can be pinched-off. This helium atmosphere not only serves as a protective atmosphere but also allows the container to be tested for leak proofness by a helium leak detector.

Figure 4:
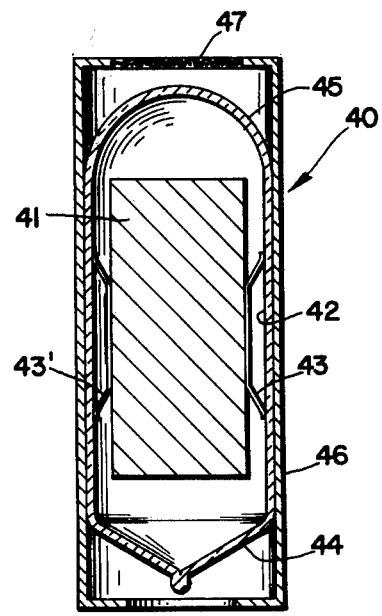
FIG. 4 is a sectional view of a further encapsulated gas sorbing device suitable for use in a nuclear fuel element.

FIG. 4 shows a getter device 40, suitable for use in a nuclear fuel element, comprising an activated non-evaporable getter material 41 held within a glass container 42 by means of optional springs 43, 43'. End 44 of glass container 42 has been sealed by normal glass blowing techniques while the other end is a dome 45 of prestressed glass. Glass container 42 is placed within a metal holder 46 which terminates at one end in a porous metal body 47 which is shown in this case as a wire mesh. Glass dome 45 may be concave, flat, or convex with respect to the getter material 41.

Figure 5:
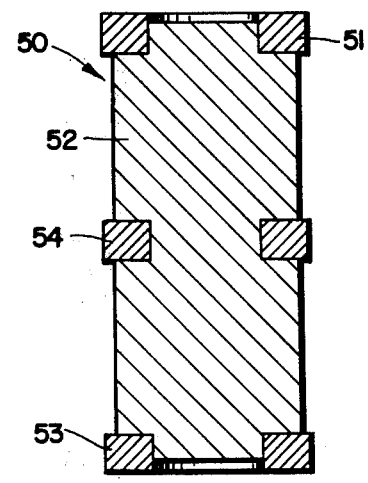
FIG. 5 is a sectional view of a further gas sorbing device suitable for use in a nuclear fuel element.

FIG. 5 shows a getter device 50 comprising a first metal annular ring 51 at one end of a body 52 of getter material and a second metal ring 53 at the other end of the body 52 of getter material. A central annular metal ring 54 is also provided.

Figure 6:
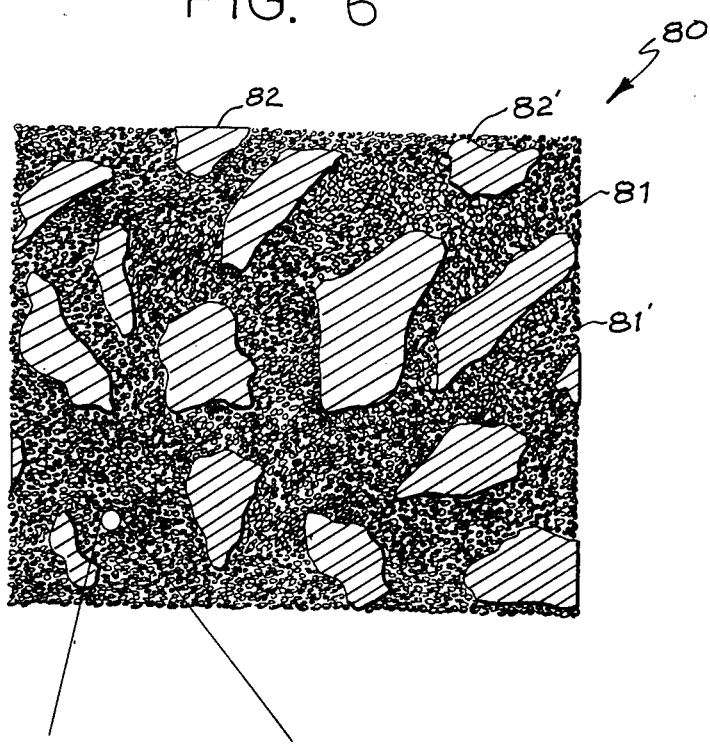
FIG. 6 is an enlarged view of a getter material useful in the present invention.

Referring now to FIG. 6, there is shown a getter composition 80 useful in the present invention. The composition 80 comprises particles 81, 81' of a sintered particulate non-evaporable getter metal. The composition also comprises particles 82, 82' of a refractory material. As can be seen by reference to FIG. 6, the particles 82, 82' of the refractory material are larger than the particles 81, 81' of the getter metal. It can also be seen that the particles 82, 82' of the refractory material are distributed throughout the particles of the getter metal 81, 81'. Furthermore, the particles of the refractory material 82, 82' are generally spaced out of contact with one another.

Figure 7:
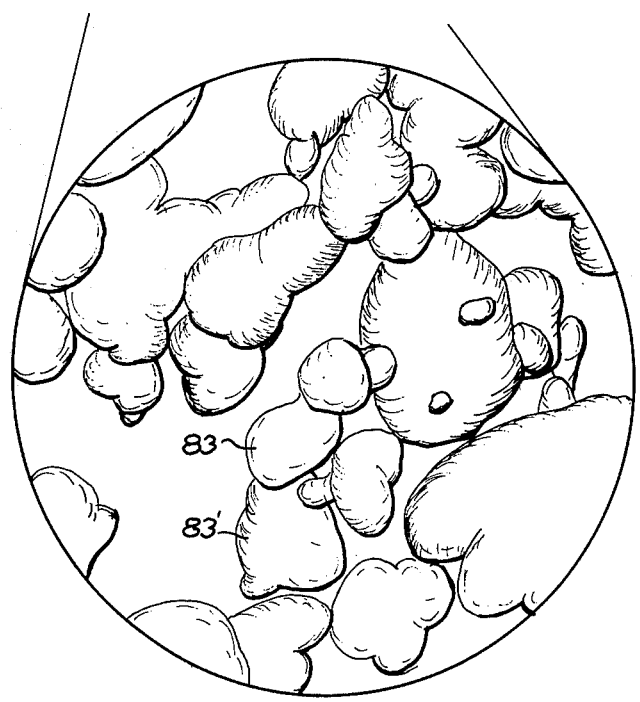
FIG. 7 is a greatly enlarged view of the indicated portion of FIG. 6.

Referring now to FIG. 7, there is shown an enlarged view of a portion of the particles 81, 81' of FIG. 6. As shown in FIG. 7, particles 83, 83' corresponding to particles 81, 81' are in contact with one another and are sintered to one another. The particles 83, 83' have a surface area after sintering which is substantially equal to and generally is at least 95% their surface area before sintering. On the other hand, the sintering is conducted long enough in order to provide the composition 80 with a compressive strength of at least 50 and preferably at least 300 kg/cm². The refractory can be any of those described above. When the refractory particles 82, 82' are graphite the composition 80 has the structure and properties as described in U.S. Pat. No. 3,584,253. When the refractory particles are the zirconium-aluminum alloy known as St 101, described in U.S. application Ser. No. 383,677.

The invention is further illustrated by the following examples in which all parts and percentages are by weight unless otherwise indicated. These non-limiting examples are illustrative of certain embodiments designed to teach those skilled in the art how to practice the invention and to represent the best mode for carrying out the invention.

EXAMPLE 1

Particulate zirconium is mixed with a particulate 16% Al-84% Zr alloy in the ratio Zr:Zr-Al = 3:2. This mixture is then made into a fairly fluid paste in the form of an alcoholic suspension. A graphite mould having a 1 mm wall thickness and defining a cylinder of 10 mm in height and 9 mm in diameter is filled with the paste. The graphite mould containing the paste is placed in a vacuum of about $10^{-5}$ to $10^{-6}$ torr. The temperature is increased from room temperature to between 900 and 1100° C. during a period of 25 minutes. The temperature between 900° and 1100° C. is maintained for a period of 5 minutes. The moulds are removed from the furnace after cooling to room temperature. The cylinder of getter material is removed from the mould. A total of five cylinders is made. The five cylinders are placed in a stainless steel container and attached to a conventional high vacuum pumping system by means of a metal pumping stem. The steel container is degassed by heating to 350° C. for 2 hours at $10^{-7}$ torr pressure and then the getter material cylinders are activated by heating to 900° C. for 10 minutes. When the pressure is again at $10^{-7}$ torr or less and when the cylinders have cooled to room temperature the metal pumping stem is pinched-off and the steel container containing the five getter cylinders is removed.

Five nuclear fuel element sheaths are taken and an end cap is attached to one of their ends. Fuel pellets are inserted within the sheath, the last pellet being replaced by a disc of $ZrC_2$ heat insulator, leaving an empty plenum chamber. Within a controllable atmosphere working vessel the fuel elements are evacuated to a pressure of about 1 torr and heated up to 200° C. for 6 hours. The fuel elements are back filled with nitrogen and then re-evacuated to 1 torr. These steps are repeated 50 times during the 6 hours heating. The working vessel is then flushed with helium. Still within the working vessel the steel container containing the five getter cylinders is opened and one getter cylinder is placed in each of the fuel element plenum chambers. A stainless steel spring is inserted and the second end cap is placed in position. The end cap is welded to the fuel element sheath by electron beam welding which maintains the heat generated mainly localized in the region of the weld. The fuel element is back filled with 20 atmospheres pressure of helium. The fuel element is hermetically sealed by electron beam welding. The fuel element is removed and stored at a temperature of 175° C. for 6 weeks. The fuel elements are irradiated in a nuclear reactor and after a period of time are inspected. They show no signs of fatigue or embrittlement.

EXAMPLE 2

Getter material cylinders are prepared as in Example 1 except that the getter cylinders are not placed together in one stainless steel tube but are placed individually in small containers each provided with a pressure rupturable means and a pumping stem. The getter cylinders are then individually activated using the same conditions as in Example 1 except that before removing the containers from the vacuum system they are back filled with helium to a pressure of 1.3 atmospheres. Fuel elements are prepared as in example 1 except that the getter cylinders are not removed from their containers but the whole container is placed in the fuel element. The fuel element is back filled with helium to 20 atmospheres pressure which simultaneously ruptures the getter cylinder container. The fuel element is hermetically sealed by electron beam welding. The fuel elements are removed and stored at a temperature of 175° C. for 6 weeks. The fuel elements are irradiated in a nuclear reactor and after a period of time are inspected. They show no signs of fatigue or embrittlement.

EXAMPLE 3

Fuel elements are prepared as in example 1 except that no getter cylinder is introduced. The fuel elements are irradiated in a nuclear power reactor and after a period of time they are inspected. They show signs of local embrittlement.

EXAMPLE 4

Fuel elements are prepared as in U.S. Pat. No. 3,141,830 except that after preparation the fuel elements are stored at a temperature of 175° C. for 6 weeks. The fuel elements are irradiated in a nuclear power reactor and after a period of time they are inspected. The fuel elements, in general, showed signs of fatigue and embrittlement.

Although the invention has been described in considerable detail with reference to certain preferred embodiments thereof, it will be understood that variations and modifications can be effected within the spirit and scope of the invention as described above and defined in the appended claims.

what is claimed is:

1. A method of manufacturing a nuclear fuel element comprising the steps of
   (A) pumping the fuel element to sub-atmospheric pressure
   (B) heating the fuel element to a temperature below that at which the fuel element walls commence to sorb gas
   (C) filling the fuel element with a washing gas to about atmospheric pressure
   (D) pumping the fuel element to sub-atmospheric pressure
   (E) inserting a non-evaporable activated getter material into the nuclear fuel element
   (F) filling the fuel element with helium to super-atmospheric pressure
   (G) sealing the fuel element
   (H) heating the fuel element and getter material to a temperature below that at which the fuel element walls commence to sorb gas.

2. A method of manufacturing a nuclear fuel element comprising the step of:
   (A) pumping the fuel element to sub-atmospheric pressure
   (B) heating the fuel element to a temperature below that at which the fuel element walls commence to sorb gas
   (C) filling the fuel element with a washing gas to about atmospheric pressure
   (D) pumping the fuel element to sub-atmospheric pressure
   (E) inserting a non-evaporable activated getter material enclosed in a housing having a pressure sensitive rupturing means into the nuclear fuel element
   (F) filling the fuel element with a rare gas to super-atmospheric pressure
   whereby the rupturing means is ruptured and
   (G) sealing the fuel element and (H) heating the fuel element and getter material to a temperature below that at which the fuel element walls commence to sorb gas.

3. A method of claim 1 in which steps A to D are performed two or more times.

4. A method of claim 1 in which the temperature of step B is between 150° and 250° C.

5. A method of claim 1 in which the washing gas is nitrogen.

6. A method of claim 1 in which the temperature is step H is between 120° and 250° C.

7. A nuclear fuel element produced by any of the methods of claim 1.

* * * * *

UNITED STATES PATENT AND TRADEMARK OFFICE
CERTIFICATE OF CORRECTION

PATENT NO. : 4,124,659

DATED : Nov. 7, 1978

INVENTOR(S) : PAOLO DELLA PORTA, ET AL

It is certified that error appears in the above-identified patent and that said Letters Patent are hereby corrected as shown below:

Col. 8, Line 60, insert after "St 101,":

--the composition 80 has the structure and properties as--.

Signed and Sealed this

Sixth Day of March 1979

[SEAL]

Attest:

RUTH C. MASON
Attesting Officer

DONALD W. BANNER
Commissioner of Patents and Trademarks